United States Patent
Grant et al.

(10) Patent No.: US 11,553,634 B2
(45) Date of Patent: Jan. 17, 2023

(54) ROBOTIC AGRICULTURAL REMEDIATION

(71) Applicant: X Development LLC, Mountain View, CA (US)

(72) Inventors: Elliott Grant, Woodside, CA (US); Hongxiao Liu, Santa Clara, CA (US); Zhiqiang Yuan, San Jose, CA (US); Sergey Yaroshenko, Newark, CA (US); Benoit Schillings, Los Altos Hills, CA (US); Matt VanCleave, Los Altos, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 656 days.

(21) Appl. No.: 16/589,833

(22) Filed: Oct. 1, 2019

(65) Prior Publication Data
US 2021/0092891 A1    Apr. 1, 2021

(51) Int. Cl.
| | | |
|---|---|---|
| A01M 21/04 | (2006.01) | |
| A01B 39/18 | (2006.01) | |
| G06T 7/70 | (2017.01) | |
| A01D 34/00 | (2006.01) | |
| G05D 1/02 | (2020.01) | |
| G06V 20/64 | (2022.01) | |

(52) U.S. Cl.
CPC ............ *A01B 39/18* (2013.01); *A01D 34/008* (2013.01); *A01M 21/043* (2013.01); *G05D 1/0246* (2013.01); *G06T 7/70* (2017.01); *G06V 20/64* (2022.01); *G05D 2201/0201* (2013.01); *G06T 2207/30188* (2013.01)

(58) Field of Classification Search
CPC . A01B 39/18; G06T 7/70; G06T 2207/30188; G06V 20/64; A01D 34/008; A01M 21/043; G05D 1/0246; G05D 2201/0201
USPC .......................................................... 47/1.5
See application file for complete search history.

(56) References Cited

U.S. PATENT DOCUMENTS

| | | | |
|---|---|---|---|
| 5,442,552 | A | 8/1995 | Slaughter et al. |
| 7,854,108 | B2 | 12/2010 | Koselka et al. |
| 9,658,201 | B2 | 5/2017 | Redden et al. |
| 9,756,771 | B2 | 9/2017 | Redden |
| 9,913,429 | B1 | 3/2018 | Stubbs et al. |
| 10,219,449 | B2 | 3/2019 | Redden |

(Continued)

FOREIGN PATENT DOCUMENTS

| | | |
|---|---|---|
| EP | 3279831 | 2/2018 |
| WO | 2017002093 | 1/2017 |

OTHER PUBLICATIONS

Escarda Technologies: Laser-based weedings an ecological alternative to chemical herbicides; https://www.escarda.eu/technology/; 2019; 2 pages.

(Continued)

*Primary Examiner* — Mahmoud S Ismail
(74) *Attorney, Agent, or Firm* — Gray Ice Higdon (57) ABSTRACT

Implementations are described herein for analyzing vision data depicting undesirable plants such as weeds to detect various attribute(s). The detected attribute(s) of a particular undesirable plant may then be used to select, from a plurality of available candidate remediation techniques, the most suitable remediation technique to eradicate or otherwise eliminate the undesirable plants.

20 Claims, 7 Drawing Sheets

(56) References Cited

U.S. PATENT DOCUMENTS

| | | | |
|---|---|---|---|
| 2016/0029612 A1* | 2/2016 | Hyde | A01G 22/00 |
| | | | 701/28 |
| 2017/0034986 A1* | 2/2017 | Koch | A01D 41/127 |
| 2018/0330166 A1 | 11/2018 | Redden et al. | |
| 2021/0084813 A1* | 3/2021 | Chrysanthakopoulos | |
| | | | A01D 34/008 |
| 2021/0112704 A1* | 4/2021 | Cavender-Bares | A01C 21/007 |
| 2022/0044030 A1* | 2/2022 | Neumann | A01M 7/0089 |

OTHER PUBLICATIONS

Darby, H. "Precision Weed Management" University of Vermont Extension, Cultivating Healthy Communities; https://www.uvm.edu/sites/default/files/UVM-Extension-Cultivating-Healthy-Communities/PSEP_CommPest2019DarbyPrecisionWeedMgt.pdf; 2019; 65 pages.
European Patent Office; International Search Report and Written Opinion of Ser. No. PCT/US2020/053666; 11 pages; dated Feb. 5, 2021.

* cited by examiner

ROBOTIC AGRICULTURAL REMEDIATION

BACKGROUND

Weeds and other undesirable plants constitute a major cost for the agricultural industry. Many weeds can be treated with herbicides, but for a variety of reasons there is increasing resistance to their use. Herbicides can be expensive, especially when applied in a non-targeted, blanket manner. Herbicides are also coming under increasing environmental scrutiny for their role in contaminating groundwater and other water sources. There is a perception that chemicals used in agriculture may be harmful to human health from extended exposure, putting pressure on growers to stop using them. Additionally, with the increasing popularity of organic farming—for which non-organic herbicides are not typically permitted—organic herbicides may be cost-ineffective and/or inefficient. And many undesirable plants are developing resistance to herbicides.

With recent advances in artificial intelligence it has become practical to identify and classify individual plants as undesirable based on various types of sensor data, particularly two-dimensional ("2D") vision data. For example, robots can travel through a field acquiring vision data that can be analyzed to identify/classify undesirable plants such as weeds or other interlopers. However, weeds come in numerous different types, morphologies, sizes, maturity levels, and/or arrangements relative to other, desired plants. This makes weed management challenging for robots, which are typically better at homogenous tasks.

SUMMARY

Implementations disclosed herein are directed to analyzing vision data depicting undesirable plants such as weeds to detect various attribute(s). The detected attribute(s) of a particular undesirable plant may then be used to select, from a plurality of available candidate remediation techniques, the best remediation technique to eradicate or otherwise eliminate the undesirable plants. In this manner, individual plants can be eradicated without the blanket use of herbicide(s), which reduces or even eliminates herbicide costs and environmental impact, and slows the evolution of undesirable plants' herbicide resistance.

In some implementations, a method for robotic remediation of one or more plants may be implemented by one or more processors and may include: deploying one or more robots amongst a plurality of plants; acquiring, using one or more vision sensors of one or more of the robots, vision data that depicts one or more of the plurality of plants; analyzing the vision data to detect one or more attributes of a given plant of the one or more plants; and selecting a remediation technique to exterminate the given plant, wherein the remediation technique is selected from a plurality of candidate remediation techniques based on the one or more detected attributes, and wherein at least one the plurality of candidate remediation techniques is implementable autonomously by one or more of the robots.

In various implementations, the one or more attributes include a maturity level of the given plant. In various implementations, the one or more attributes include a morphology of the given plant. In various implementations, the one or more attributes include a genus or species of the given plant.

In various implementations, at least two of the plurality of candidate remediation techniques are implementable autonomously by one or more of the robots. In various implementations, the at least two of the plurality of candidate remediation techniques are selected from the following: incinerating the given plant with a single beam of coherent light; incinerating the given plant with multiple beams of coherent light; destroying the given plant with voltage transmitted through ionized air; and mechanically destroying the plant with a mass launched at a high velocity. In various implementations, the mass launched at the high velocity may be constructed with controlled-release fertilizer. In various implementations, the mass may take the form of a gelatin-filled capsule or a piece of ice.

In various implementations, the method may further include analyzing the vision data to classify the given plant as a target for extermination. In various implementations, the given plant is a weed or a target for crop thinning.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Techniques are described herein for analyzing vision data depicting undesirable plants such as weeds to detect various attribute(s). The detected attribute(s) of a particular undesirable plant may then be used to select, from a plurality of available candidate remediation techniques, the best remediation technique to eradicate or otherwise eliminate the undesirable plants. In this manner, individual plants can be eradicated without the blanket use of herbicide(s), which reduces or even eliminates herbicide costs and environmental impact, and slows the evolution of undesirable plants' herbicide resistance.

Some candidate remediation techniques may be performable by a robot, autonomously or at least semi-autonomously. For example, some robots may be equipped with a device operable to generate beam of coherent light, such as a laser, that can be focused on, and used to incinerate or denature, an undesirable plant. As another example, some robots may be equipped with multiple coherent light devices whose coherent light beams can be combined to incinerate or denature the undesirable plant. With multiple coherent light beams it is possible to use less power per coherent light beam, which may have safety benefits. It may also be possible to operate a single coherent light beam to "paint" (e.g., cast a dot) the undesirable plant as a target, and then have the other coherent light beam(s) automatically focus their beams on the dot using optical tracking. Yet other robots may be equipped with devices that can ionize a beam of air towards a targeted plant. This ionized beam of air can then be used to apply voltage to the targeted plant, which may eradicate the plant.

Additionally or alternatively, some robots may be equipped with launchers that are operable to launch masses at high velocities. These launchers may be air-powered, combustion-powered (e.g., using propellant), steam-powered, electromagnetic, etc. These launchers may launch masses(s) at high velocities towards an undesirable plant to inflict enough kinetic/mechanical damage to eradicate the undesirable plant. In some cases, the launched masses themselves may be constructed with chemicals or materials that are beneficial—or at least minimally harmful to—surrounding plants and/or the environment. For example, the masses may take the form of gel caps that melt and/or dissolve into a harmless liquid sometime after impact. In other implementations, the masses may take the form of rocks, ice, dirt (e.g., mud), compressed air bursts, or any other material that may be obtained locally by the robot and/or is unlikely to cause significant collateral damage.

Additionally or alternatively, the masses may be constructed with or otherwise contain beneficial chemicals such as fertilizer or other chemicals that may positively affect nearby desirable plants after impact with the undesirable plant. For example, some launched masses may be constructed with controlled-release fertilizer. Other launched masses may be constructed with herbicide, which may inflict additional damage on the targeted undesirable plant in addition to the kinetic/mechanical damage caused by the launched mass' impact.

Some robots may also be equipped with robot arms and/or end effectors that are designed to allow the robot to mechanically act upon (e.g., pull/extract, manually destroy/damage) an undesirable plant, autonomously or under at least some human control. For example, a robot may be equipped with a gripper-style end effector that is operable to grasp a portion of the plant as close to the ground as possible. Once the plant is grasped in this manner, the robot can pull the entire undesirable plant—roots and all—from the soil.

Other candidate remediation techniques may be best performed by a human. For example, a weed may be inextricably intertwined with nearby desirable plants. A robot may lack the dexterity or accuracy required to extract the weed without hurting the nearby desired plants. Accordingly, in some implementations, an undesirable plant may be designated by a robot for human intervention, e.g., using a blast of marking material such as plant-safe paint, and/or by being flagged digitally using position coordinates of the plant (e.g., the robot can "drop a pin"). In either case, the position coordinates of multiple undesirable plants may be cataloged and provided to agricultural personnel for manual eradication.

As mentioned previously, the most effective/efficient way to eradicate a particular undesirable plant may vary depending on one or more attributes of the weed, such as its genus/species, maturity level, morphology, proximity to or measure of entanglement with other desirable plants, etc. Accordingly, vision data depicting the undesirable plant may be analyzed to detect these attributes, so that the most effective and/or efficient candidate remediation technique can be selected. Various types of vision data analysis may be employed to detect these attributes.

In some implementations, one or more machine learning models, such as a convolutional neural network ("CNN"), may be trained to detect one or more undesirable plant attributes in vision data. For example, a single CNN may be trained to make multiple predictions about a depicted plant's attributes, such as its age or level of maturity (e.g., per se or relative to a crop cycle), its morphology, genus or species, relationship with neighboring plants, etc. Additionally or alternatively, a separate CNN (or more generally, machine learning model) may be trained to detect each of these attributes. In some implementations, an ensemble of machine learning models, such of which may or may not be CNNs, may be employed to detect the various attributes (or lack thereof). Other types of machine learning models may additionally or alternatively be employed. These may include but are not limited to various flavors of recurrent neural networks (e.g., long short-term memory, or "LSTM"; gated recurrent units, or "GRU"), transformer neural networks, generative adversarial networks, feed-forward neural networks, support vector machines, Hidden Markov models, and so forth.

One or more detected plant attributes, alone or in combination, may then be used to select remediation techniques for eradicating or otherwise eliminating undesirable plants. For example, maturity of an undesirable plant may be highly influential in selecting a remediation technique. At a relatively young age, some weeds may be eradicated by simply being snipped at their stems or having one or more leaves destroyed/snipped. However, as those weeds mature, they may become more resilient, in which case other remediation techniques such as pulling from the base or total incineration may be required.

Morphology of an undesirable plant may also be influential in selecting a remediation technique. If it is determined (e.g., predicted using a machine learning model) that a given undesirable plant likely has a highly-developed root system, simply snipping or damaging the plant above ground may not suffice to eradicate the plant. It may be necessary to extract all or at least a significant portion of the root system in order to eradicate the plant. Alternatively, a high-velocity launched mass constructed with herbicide may also eradicate the plant.

As another example, some undesirable plants may be reliably eradicated if some percentage of their above-ground structure is damaged or destroyed. By detecting an undesirable plant's morphology, it is possible to determine a measure of the plant's above-ground structure that needs to be destroyed/damaged in order to kill the plant. This measure can then be used to select which remediation technique will be employed and/or how the remediation technique will be employed.

In addition, a genus and/or species of an undesirable plant may be influential in selecting a remediation technique. More resilient types of weeds may require full extraction for eradication. Less resilient types of weeds may only require various measures of above-ground destruction to be eradicated. Moreover, the genus and/or species of an undesirable plant may influence which herbicide to use, if that is available as a remediation technique (e.g., as part of a high-velocity launched mass).

Generally speaking, these various attributes of undesirable plants are not necessarily mutually exclusive. It is contemplated herein that various combinations of attribute values may call for various types of remediation techniques. For example, during the first stage of a particular weed's lifespan it may only require a small number of leaves be destroyed for the weed to be eradicated. However, as the weed matures into a second stage of its lifespan and its root system grows, a more thorough remediation technique may become necessary to ensure the weed's eradication. Additionally or alternatively, one attribute may be used to infer another. For example, a detected maturity level of a plant may be used to infer at least part of its morphology, such as its root system, which may not be visible in the 2D vision data.

Techniques described herein are not limited to weeds. They are applicable to any undesired plant, regardless of whether that plant is different or similar to surrounding, desired plants. For example, it is often beneficial during a crop cycle to thin crops. Once individual plants are selected for thinning, images depicting these targeted plants may be analyzed to determine attributes of the targeted plants. Those attributes can then be used to select the best remediation technique to apply, e.g., for all the targeted plants or on a plant-by-plant basis.

Figure 1A:
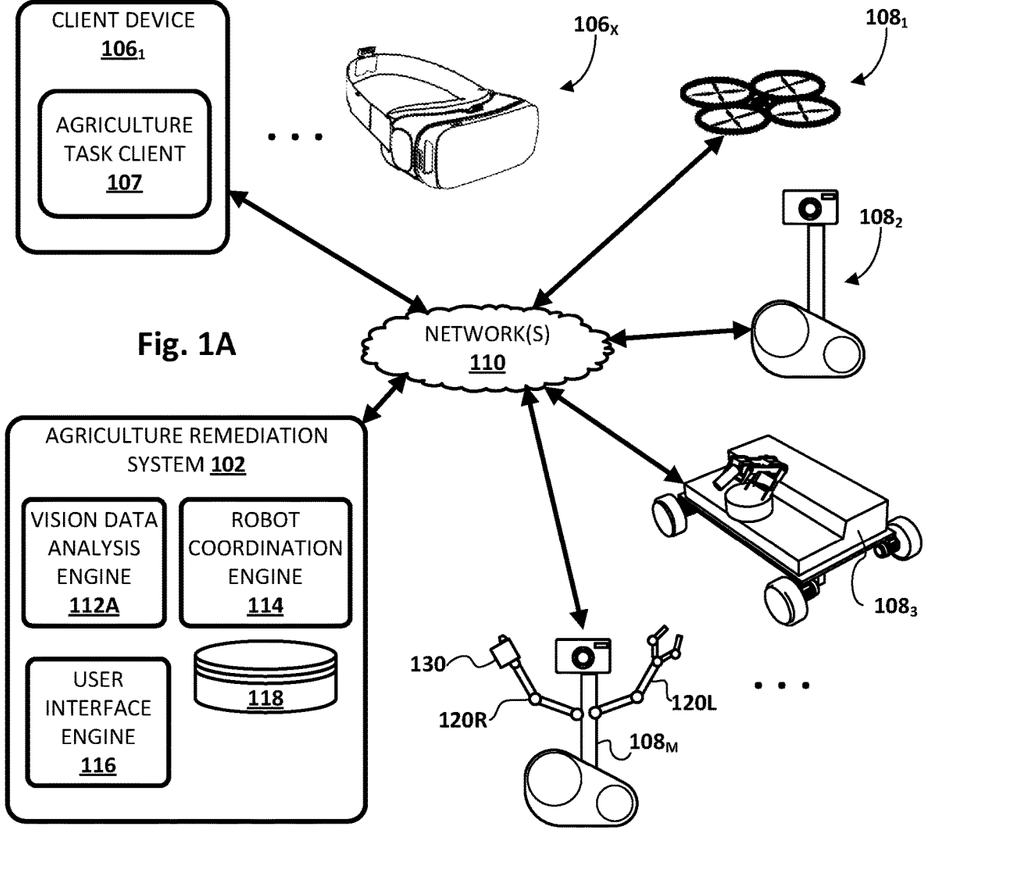
FIG. 1A schematically depicts an example environment in which disclosed techniques may be employed in accordance with various implementations.

FIG. 1A illustrates an environment in which one or more selected aspects of the present disclosure may be implemented, in accordance with various implementations. The example environment includes a plurality of client devices $106_{1-X}$, an agricultural remediation system 102, and a plurality of robots $108_{1-M}$. Each of components $106_{1-X}$, 102, and 108 may communicate, for example, through a network 110. Agricultural remediation system 102 is an example of an information retrieval system in which the systems, components, and techniques described herein may be implemented and/or with which systems, components, and techniques described herein may interface.

An individual (which in the current context may also be referred to as a "user") may operate a client device 106 to interact with other components depicted in FIG. 1A. Each component depicted in FIG. 1A may be coupled with other components through one or more networks 110, such as a local area network ("LAN") or wide area network ("WAN") such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Each of client devices 106 and agricultural remediation system 102 may include one or more memories for storage of data and software applications, one or more processors for accessing data and executing applications, and other components that facilitate communication over a network. The operations performed by client device 106 and/or agricultural remediation system 102 may be distributed across multiple computer systems. In some implementations, agricultural remediation system 102 may be implemented as, for example, computer program(s) running on one or more computers in one or more locations that are coupled to each other through a network.

Each client device 106 may operate a variety of different applications that may be used, for instance, to coordinate agricultural robot operation to perform agricultural remediation using techniques described herein. For example, a first client device $106_1$ operates agricultural task client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, etc. The wearer may interact with the presented data, e.g., using HMD input techniques such as gaze directions, blinks, etc., to coordinate robots 108 using techniques described herein.

Figure 1B:
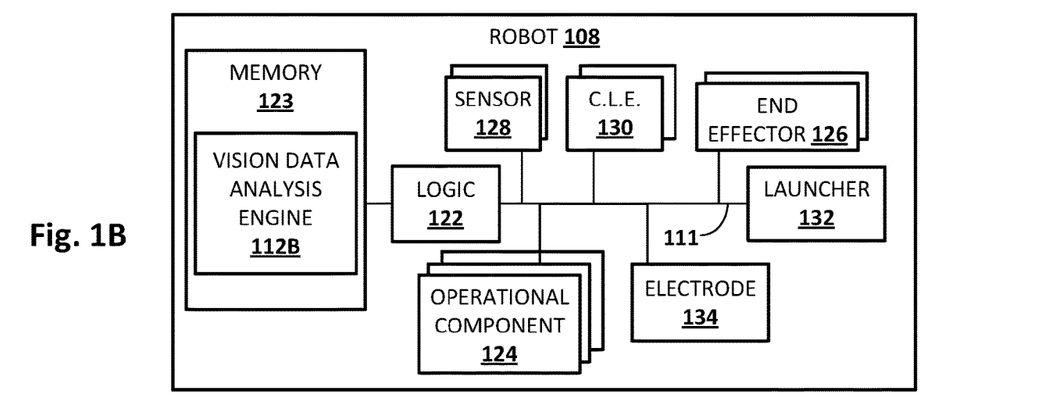
FIG. 1B schematically depicts an example robotic architecture.

In various implementations, agricultural remediation system 102 may include a vision data analysis engine 112A, a robot coordination engine 114, a user interface engine 116, and/or one or more databases 118 for storing various data used by and/or generated by components 112A-116, such as sensor data gathered by robots $108_{1-M}$, information about available remediation techniques, and so forth. In some implementations one or more of engines 112A-116 may be omitted. In some implementations all or aspects of one or more of engines 112A-116 may be combined. In some implementations, one or more of engines 112A-116 may be implemented in a component that is separate from agricultural remediation system 102. In some implementations, one or more of engines 112A-116, or any operative portion thereof, may be implemented in a component that is executed by client device 106. For example, and as depicted in FIG. 1B, in some implementations, a robot 108 may implement all or a portion of vision data analysis engine 112B locally.

In this specification, the term "database" and "index" will be used broadly to refer to any collection of data. The data of the database and/or the index does not need to be structured in any particular way and it can be stored on storage devices in one or more geographic locations. Thus, for example, database(s) 118 may include multiple collections of data, each of which may be organized and accessed differently.

Vision data analysis engine 112A may be configured to receive or obtain, e.g., from database(s) 118 and/or directly from agricultural workers (not depicted) or from robots $108_{1-M}$, 2D and/or 3D vision data. In some implementations, vision data analysis engine 112 may receive other robot sensor data as well. This other sensor data may include, for instance, position coordinates such as inertial measurement units ("IMUs"), real-time kinematic ("RTK") coordinates, GPS coordinates, etc. 2D vision data may be originally obtained (and then stored in database(s) 118) from various sources. In the agricultural context these data may be obtained manually by human workers carrying cameras or other sensors, or automatically using one or more robots $108_{1-M}$ equipped with 2D/3D vision sensors. In some implementations, human workers may simply make observations about plants using their own senses, and may manually input those observations into a database (e.g., using a spreadsheet or other software application).

Individual robots $108_{1-M}$ may take various forms, such as an unmanned aerial vehicle $108_1$, a robot (not depicted) that is propelled along a wire, track, rail or other similar component that passes over and/or between crops, wheeled robots $108_2$ to $108_M$, or any other form of robot capable of being propelled or propelling itself past crops of interest. In some implementations, different robots may have different roles, e.g., depending on their capabilities. For example, in some implementations, one or more "scout" robots $108_1$, $108_2$ may be designed to capture data, but not necessarily manipulate plants or perform physical agricultural tasks.

Based on analysis of sensor (e.g., vision) data received from various robots 108 while scouting crops and/or from other sources (e.g., human workers), vision data analysis engine 112A (or robot coordination engine 114) may identify agricultural tasks and may assign them to individual robots 108. Vision data analysis engine 112 may perform various types of image processing analysis to determine various attributes and/or conditions of plants, as well as to classify individual plants as desirable or undesirable. These plant attributes and/or conditions may include, but are not limited to, morphology (above ground and/or below ground), type (e.g., genus, species), maturity level (e.g., per se or relative to a crop cycle), and so forth. Undesirable plants may include plants that are either not intended to be present (e.g., weeds or interlopers, invasive plants, etc.), or plants that are deemed undesirable for other reasons (e.g., a subset of plants that are targeted for crop thinning).

The types of image processing that may be performed by vision data analysis engine 112A may vary among implementations. In some implementations, vision data analysis engine 112A may analyze 2D and/or 3D vision data to classify individual plants as desirable or undesirable and/or to detect their attribute(s). For plant classification, vision data analysis engine 112A may utilize a variety of different techniques, including but not limited to appearance-based methods such as edge matching, divide-and-conquer, gradient matching, greyscale matching, histograms, and/or feature-based methods such as interpretation trees, pose clustering, geometric hashing, scale-invariant feature transform ("SIFT"), speeded up robust features ("SURF"), trained machine learning models (e.g., convolutional neural networks), and so forth. Object recognition techniques such as trained CNNs may also be used to detect other attributes of plants, such as their morphology and/or maturity level.

In some implementations, vision data analysis engine 112A may be configured to select remediation technique(s) to be applied to eradicate or otherwise remove undesirable or unwanted plants. There may be a plurality of candidate remediation techniques available depending on the capabilities of robots $108_{1-M}$. This information may be stored, for instance, in database 118. For example, robot $108_M$ includes a first robotic arm 120R that includes, as an end effector, a coherent light emitter 130 that is operable to direct coherent light towards a plant, e.g., to damage or incinerate the plant. Robot $108_M$ also includes a second robotic arm 120L that includes a gripper-style end effector that can be used, for instance, to destroy above-ground structure of a plant and/or to pull the plant from the soil.

Vision data analysis engine 112A may select a particular remediation technique (whether robot-based or otherwise) from this plurality of candidate remediation techniques based on attribute(s) of individual plants it detects in 2D or 3D vision data and/or based on capabilities of available robots. Suppose vision data analysis engine 112A determines that a particular weed is too old to be destroyed merely by damaging its above-ground structure. Vision data analysis engine 112A may select a remediation technique that will attack both the weed's above-ground structure and its root system. For example, vision data analysis engine 112A may select a remediation technique in which a robot such as $108_M$ operates its robotic arm/gripper-style end effector to pull the weed out of the soil at its base. Or, vision data analysis engine 112A may select a remediation technique in which a solid mass such as a slow-release herbicide pellet is launched at the plant, to both damage the plant mechanically and to destroy its roots with the herbicide.

Robot coordination engine 114 may be configured to perform selected aspects of the present disclosure to coordinate operation of robot(s) $108_{1-M}$ to perform plant remediation. For example, robot coordination engine 114 may maintain, e.g., in database(s) 118, an inventory of robots $108_{1-M}$ that includes information about those robots, such as their specifications, capabilities, current state, value, condition, etc. Database(s) 118 may additionally or alternatively maintain an inventory of agricultural tasks to be performed by robots $108_{1-M}$, including plant remediation tasks identified by vision data analysis engine 112A.

In some implementations, when a given robot arrives at the plant that is the target of the agricultural task assigned to the given robot, robot coordination engine 114 may interact with user interface engine 116 to cause a manual control GUI to be provided, e.g., by user interface engine 116 to agricultural task client 107. This manual control GUI may be operable by the human operator to manually control the given robot to perform its agricultural task, such as remediating a plant deemed unsuitable for autonomous robotic removal. Once the human operator operates the given robot to complete the task, the given robot may transition to a next agricultural task, which may have been previously assigned to the given robot or may be assigned dynamically based on the given robot's completion of its previous agricultural task.

FIG. 1B schematically depicts an example architecture of a robot 108, in accordance with various implementations. Robot 108 may take various forms, such as those described previously. In various implementations, robot 108 may include logic 122. Logic 122 may take various forms, such as a real time controller, one or more processors, one or more field-programmable gate arrays ("FPGA"), one or more application-specific integrated circuits ("ASIC"), and so forth. In some implementations, logic 122 may be operably coupled with memory 123. Memory 123 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth. In some implementations, memory 123 may store instructions that are executable by logic 122 to implement an additional, or alternative, vision data analysis engine 112B. That way, robot 108 can perform techniques described herein while offline, or at least without necessarily being required to consult with agricultural remediation system 102.

In some implementations, logic 122 may be operably coupled with one or more operational components 124, one or more end effectors 126, and/or one or more sensors 128, e.g., via one or more buses 111. As used herein, an "operational component" 124 of a robot may broadly refer to actuators, motors (e.g., servo motors), joints, shafts, gear trains, pumps (e.g., air or liquid), pistons, drives, or other components that may create and/or undergo propulsion, rotation, and/or motion. Some operational components 124 may be independently controllable, although this is not required. In some instances, the more operational components robot 108 has, the more degrees of freedom of movement it may have.

As used herein, "end effector" 126 may refer to a variety of tools that may be operated by robot 108 in order to accomplish various tasks. For example, some robots may be equipped with an end effector 126 that takes the form of a claw with two opposing "fingers" or "digits." Such a claw is one type of "gripper" known as an "impactive" gripper, which as noted above can be operated to physically pull or otherwise mechanically/kinetically damage/destroy a targeted plant. Other types of grippers may include but are not limited to "ingressive" (e.g., physically penetrating an object using pins, needles, etc.), "astrictive" (e.g., using suction or friction or vacuum to pick up an object), or "contigutive" (e.g., using surface tension, freezing or adhesive to pick up object). In some implementations, end effector 126 may be removable, and various types of modular end effectors may be installed onto robot 108, depending on the circumstances.

Sensors 128 may take various forms, including but not limited to 3D laser scanners or other 3D vision sensors (e.g., stereographic cameras used to perform stereo visual odometry) configured to provide depth measurements, 2D cameras, light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFD") readers, radars, range finders, accelerometers, gyroscopes, compasses, position coordinate sensors (e.g., global positioning system, or "GPS"), speedometers, edge detectors, and so forth. While sensors 128 are depicted as being integral with robot 108, this is not meant to be limiting. In some implementations, one or more sensors 128 may be located external to, but may be in direct or indirect communication with, robot 108, e.g., as stand-alone units or as part of a separate control system (e.g., 102).

In addition to or instead of end effectors 126, in some implementations, robot 108 may be equipped with various components that are operable to eradicate, destroy, or otherwise remove undesirable plants. For example, robot 108 may be equipped with one or more coherent light emitters ("C.L.E." in FIG. 1B) 130. These emitters 130 may be operated to emit focused, coherent light towards a target, such as a stem or leaves of an undesirable plant. As will be described in more detail below, in some implementations, multiple coherent light emitters 130 may be provided. One may be operated to "paint" a target, e.g., with a beam of coherent light to create a painted dot or cross-hair. Other coherent light emitters 130 may then be operated to automatically track the first painted dot or cross-hair, so that they can emit their own beams of coherent light towards the same location.

Additionally or alternatively, robot 108 may be equipped with one or more launchers 132 that is/are operable to mechanically destroy or at least damage an undesirable plant with a mass launched at a high velocity. As noted previously, launcher(s) 132 may be powered in various ways, such as air-powered (e.g., with a $CO_2$ canister, compressed air), chemical propellant-powered, water-powered, steam-powered, and so forth. Launcher 132 may launch or project a mass towards the undesirable plant so that at the very least, some portion of the plant is physically (e.g., mechanically, kinetically) damaged.

In some implementations, robot 108 may be equipped with one or more electrodes 134 that are operable to apply electricity (i.e. electrocute) to undesirable plants. For example, the electrode 134 may be an end effector or appendage that can be brought into physical contact with a targeted plant. Additionally or alternatively, in some implementations, one or more coherent light emitters 130 may be operated to create an ionized beam of air towards a targeted plant. This ionized beam of air can then be used, e.g., by electrode 134 in lieu of physical contact with the targeted plant, to apply voltage to the targeted plant. However the voltage is applied, it may eradicate the targeted plant.

Figure 2:
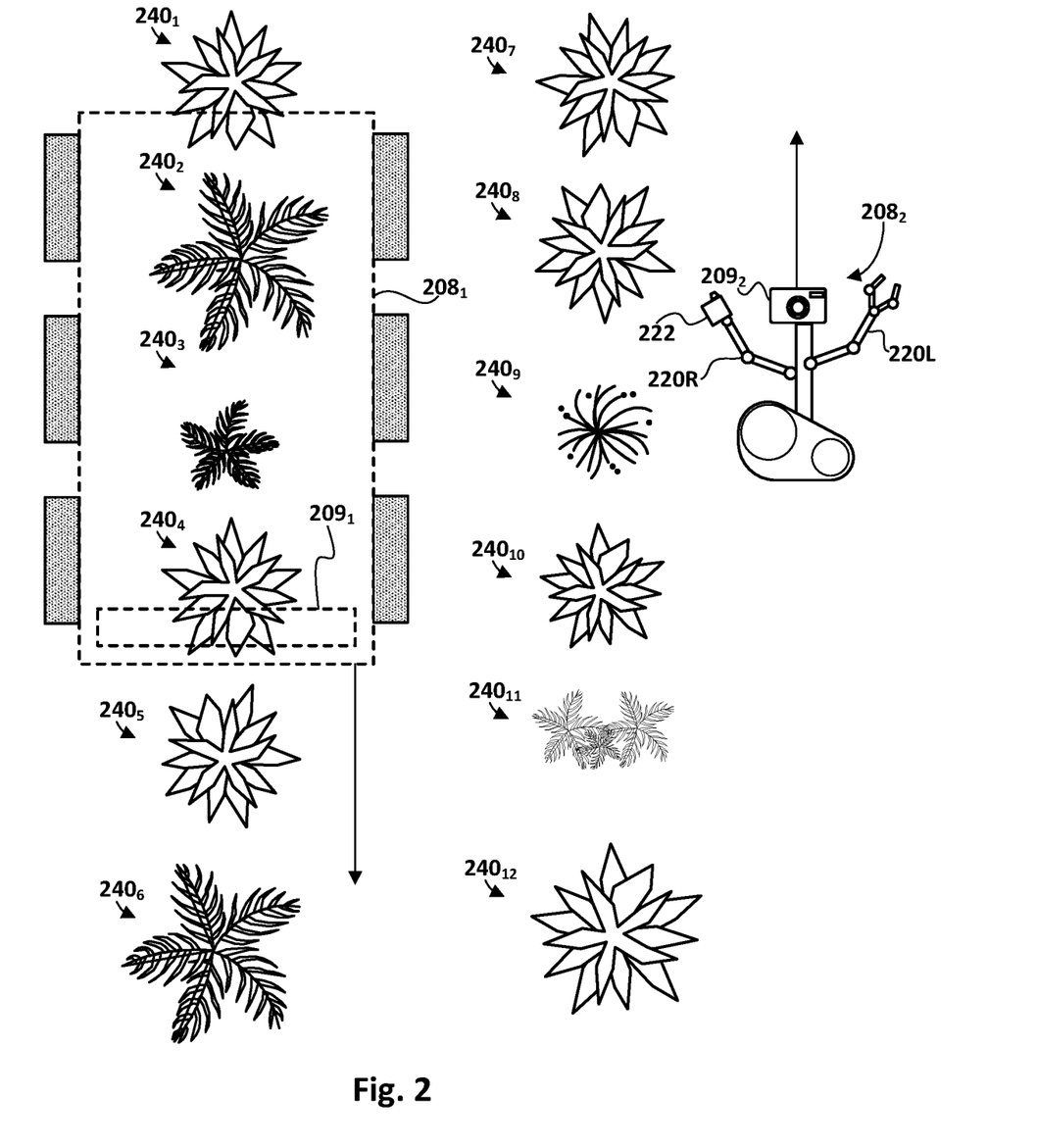
FIG. 2 depicts an example field of plants being acted upon by multiple robots configured with selected aspects of the present disclosure.

FIG. 2 depicts an example field of plants $240_{1-12}$ being acted upon by multiple robots $208_{1-2}$ to identify/classify and/or eradicate undesirable plants such as a weeds, interlopers or plants otherwise targeted for eradication (e.g., for purposes of crop thinning). First robot $208_1$ takes the form of a wheeled robot that straddles (i.e., so that its wheels flank) the first row of plants $240_{1-6}$. First robot $208_1$ is moving in the downward direction and is both processing vision data it gathers about a first row of plants $240_{1-6}$ using its vision sensor $209_1$, as well as eradicating undesirable plants it identifies via its vision processing. As noted previously, in various implementations, first robot $208_1$ may have an onboard vision data analysis engine 112B to process the vision data locally, may delegate the vision processing to a remote vision data analysis engine 112A, or any combination of the two. Second robot $208_2$, by contrast, is equipped with two robot arms 220L and 220R, and moves alongside, rather than over, second row of plants $240_{7-12}$. Otherwise, second robot $208_2$ may operate on second row of plants $240_{7-12}$ similarly to first robot $208_1$, e.g., using its own vision sensor $209_2$ to gather data that is processed locally (112B) or in the cloud (112A), so that second robot $208_2$ can eradicate undesirable plants such as weeds.

In FIG. 2, the crops are experiencing a relatively substantial invasion of weeds. In the first row, first plant $240_1$, fourth plant $240_4$, and fifth plant $240_5$ appear relatively healthy. However, second plant $240_2$ and third plant $240_3$, as well as sixth plant $240_6$, appear to be different types of plants, likely weeds. Accordingly, plants $240_2$, $240_3$, and $240_6$ may be classified as weeds or otherwise targeted for eradication, e.g., by first robot $208_1$ based on vision data it gathers using vision sensor $209_1$ or remotely at cloud-based vision data analysis engine 112A. First robot $208_1$ may then eradicate or otherwise remove these targeted plants using one or more remediation techniques described herein that are likely to be most effective against those targeted plants. In the second row of plants $240_{7-12}$, plants $240_7$ and $240_9$ (actually a cluster of multiple plants) appear to be weeds. Second robot $208_2$ may identify/classify these plants as targeted for eradication, and may select an appropriate remediation technique, based on local or remote analysis of vision data gathered using vision sensor $209_2$.

Figure 3A:
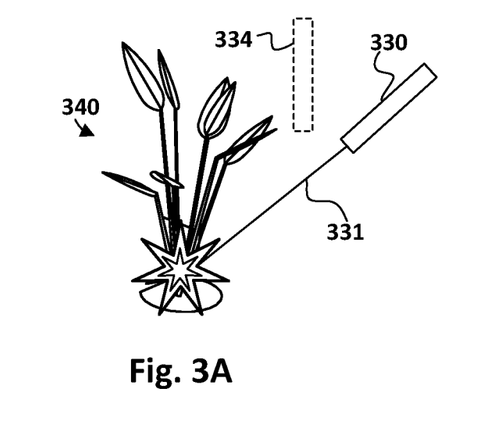
FIGS. 3A, 3B, 3C, 3D, 3E, and 3F depict a variety of different examples of how a robot may eradicate an undesirable plant.

FIGS. 3A-F depict various remediation techniques that may be employed by robots in various implementations described herein. In FIG. 3A, a coherent light emitter 330 is operated to cast a beam 331 of coherent light towards a targeted plant 340. This beam 331 may be used by itself to damage or entirely incinerate targeted plant 340. Or, in some implementations, coherent light beam 331 may effectively create an ionized beam of air that is capable of conducting electricity. In some such implementations, an electrode 334 may be operated to apply a voltage down the ionized beam 331 of air to destroy/damage the targeted plant 340.

Figure 3B:
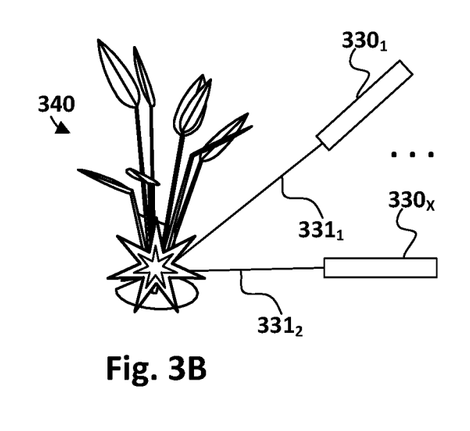

In FIG. 3B, coherent light is also used to eradicate targeted plant 340. However, in this example, multiple coherent light emitters $330_{1-X}$ are provided. In some such implementations, these multiple emitters may focus their respective beams $331_{1-X}$ of coherent light onto targeted plant to eradicate it. Because there are multiple beams, each beam may be powered with less energy than in implementations in which a single beam is used, such as that depicted in FIG. 3A. In some such implementations, a first coherent light emitter $330_1$ may be used to paint a target on targeted plant 340. The remainder of the multiple coherent light emitters $330_{2-X}$ may be operated to track the painted target and focus their respective beams $331_{2-X}$ of coherent light on targeted plant 340.

Figure 3C:
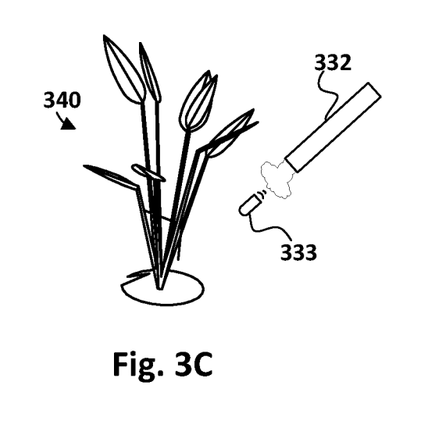

In FIG. 3C, a launcher 332 is operated to launch a mass 333 at a relatively high velocity towards targeted plant 340. Impact of mass 333 with targeted plant 340 may cause sufficient mechanical and/or kinetic damage to cause targeted plant 340 to die and wither away. In addition, in some such implementations, mass 333 may be constructed with various materials that are selected to aid in destroying targeted plant 340 and/or to benefit (or at least not harm) nearby plants. For example, in some implementations, mass 333 may be constructed with slow-release herbicide or fertilizer that can keep other weeds at bay and/or benefit neighboring plants. In some implementations, mass 333 may be constructed as a gelatin-filled capsule that dissolves sometime after impact. It can be constructed, for instance, with harmless/beneficial material, such as water. Additionally or alternatively, in some implementations, a robot (not depicted in FIG. 3C) may utilize materials in the field to create mass 333. For example, the robot may gather dirt and/or other debris and construct mass 333, e.g., using water or other similar material. Or, the robot could gather one or more rocks or stones and use those as the mass 333.

Figure 3D:
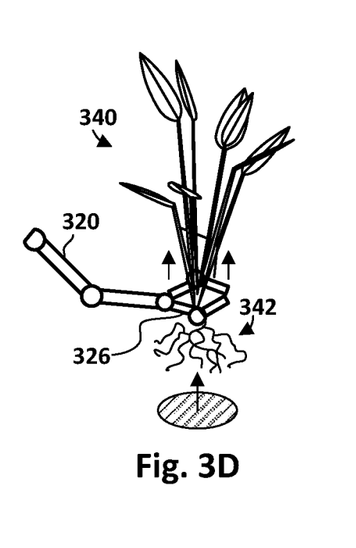

In FIG. 3D, a robotic arm 320 is equipped with an end effector 326 in the form of a gripper. Robotic arm 320 is operated to grasp targeted plant 340 near its base and pull targeted plant 340, roots 342 and all, from the soil. This remediation technique may be particularly effective in situations in which targeted plant 340 is relative mature and/or has a robust root system that makes anything short of fully pulling the weed ineffective.

Figure 3E:
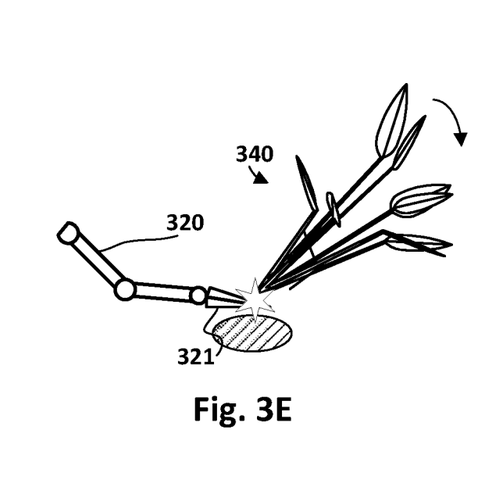
Figure 3F:
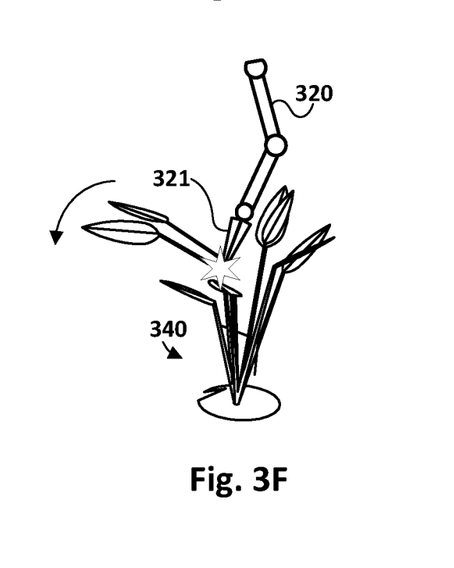

In FIG. 3E, a robotic arm 320 is equipped with a shear-style end effector 321 that is operable to cut or snip portions of targeted plant 340. In this example, robotic arm 320 is operated to snip targeted plant 340 near its base, causing targeted plant 340 to tip over as shown. This may be sufficient, for instance, when it is determined by vision data analysis engine 112 (A or B) that it is not necessary to extract roots of targeted plant 340; destroying the above-ground structure may be sufficient to eradicate targeted plant 340. FIG. 3F is similar to FIG. 3E, except that instead of snipping targeted plant 340 at its base, robotic arm 320 is operated to snip or destroy other portions of above-ground structure of targeted plant 340. This remediation technique may be sufficient where targeted plant 340 is not particularly resilient, and will die as a result of relatively minor above-ground damage.

Figure 4:
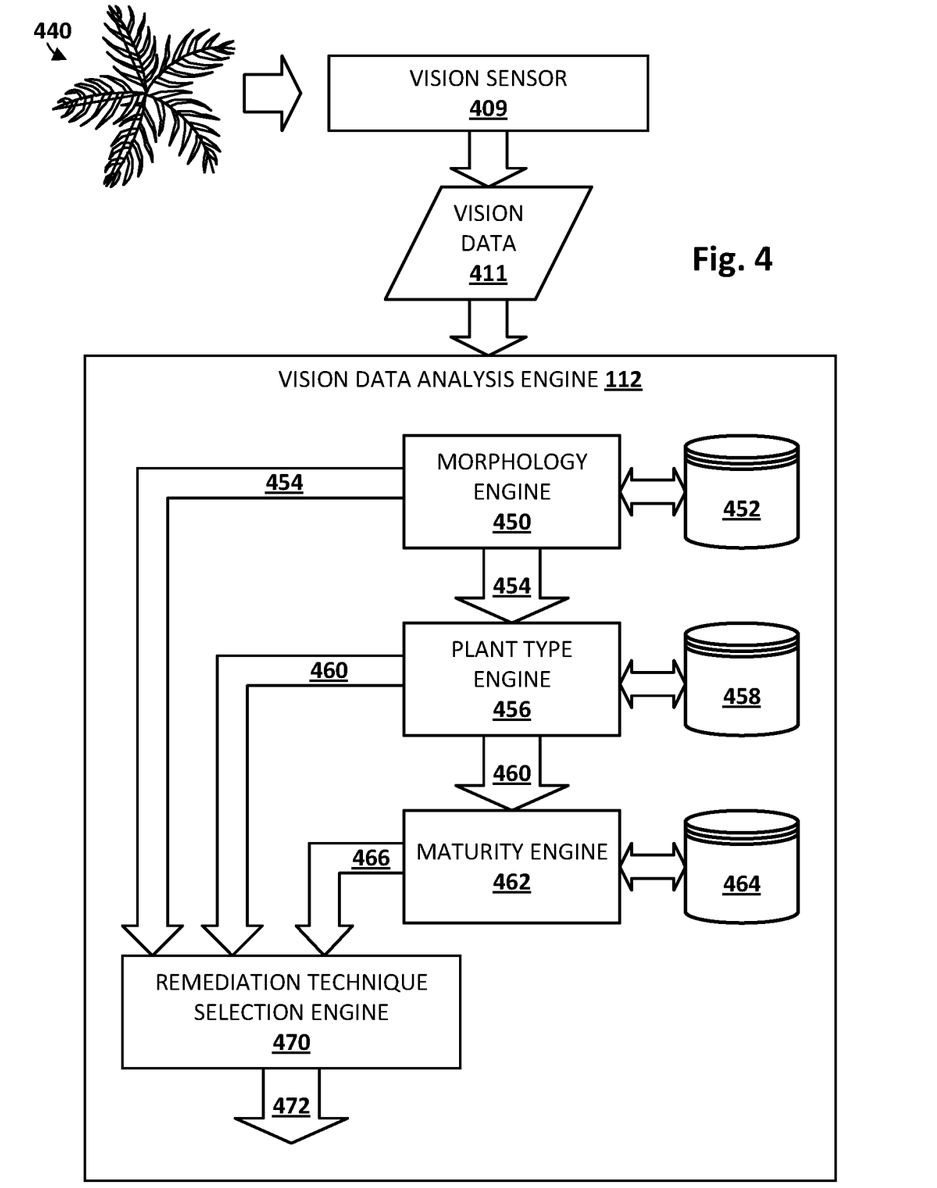
FIG. 4 schematically depicts one example of how vision data may be processed and used to make decisions regarding plant remediation, in accordance with various implementations.

FIG. 4 depicts one example configuration of a vision data analysis engine 112 (A or B) that may be implemented as part of agricultural remediation system 102 and/or locally on a robot. Light reflecting off a plant 440 is captured by a vision sensor 409 (which may be part of a robot or carried by agricultural personnel), and the captured vision data 411 is provided to vision data analysis engine 112. This vision data 411 may then be processed and/or analyzed by various different components so that, ultimately, a remediation technique may be selected to eradicate, destroy, damage, or otherwise remove plant 440. Plant 440 may be a weed, an interloper, an otherwise desirable plant that is targeted for thinning, etc.

In FIG. 4, vision data analysis engine 112 includes a morphology engine 450 operably coupled to a morphology database 452, a plant type engine 456 operably coupled with a plant type database 458, and a maturity engine 462 operably coupled with a maturity database 464. One or more of components 450, 456, and 462, and one or more aspects of vision data analysis engine 112 as a whole, may be implemented using any combination of hardware or computer-readable instructions. Moreover, the order of components depicted in FIG. 4 is not meant to be limiting. These components 450, 456, and 462 may be reordered, combined, omitted, and/or other components may be added.

Morphology engine 450 may be configured to analyze vision data 411 to detect one or more morphological attributes of plant 440, which may be provided as morphological output 454. For example, morphology engine 450 may use various techniques, such as edge detection, object matching, etc., to identify dimensions and/or components of plant 440, such as its leaves, stem, height, width, color, etc. These dimensions and/or components may extracted and used by a remediation technique selection engine 470, alone or in combination with other data, to select a remediation technique. For example, if a particular plant such as a dandelion includes a seed head, as opposed to a flower head, it may be best to incinerate the dandelion, rather than pull it, which may cause one or more seeds to be inadvertently dispersed.

In some implementations, morphology database 452 may include one or more statistical models, such as machine learning models that are trained to predict or infer structure of plant 440 that may or may not be explicitly captured in vision data 411. As an example, root structure of plant 440 may not be visible in vision data 411. However, vision data 411 (or other data indicative thereof, such as an embedding) may be applied as input across one or more training machine learning models stored in database 452 to estimate, infer, or predict dimensions and/or other attributes of underground structure of plant 440. The inferred absence or presence of these roots, and/or their inferred or predicted size, may dictate which remediation techniques are appropriate, and which are not.

In some implementations, morphology engine 450 may provide morphological output 454 directly to remediation technique selection engine 470. Additionally or alternatively, in some implementations, morphology engine 450 may provide morphological output 454 to one or more downstream components of vision data analysis engine 112. In the former case, remediation technique selection engine 470 may select one or more remediation techniques to eradicate plant 440 based on the morphological output 454, alone or in combination with other data. For example, if plant 440 is determined to have a width that exceeds some threshold, it may be assumed that only those remediation techniques that remove or otherwise attack root structure will suffice.

In the latter case, morphological output 454 may be processed by a downstream component such as plant type engine 456, alone or in combination with vision data 411, to generate plant type output 460 that indicates a type (e.g., genus, species) of plant 440. In some cases, morphological features determined by morphology engine 450 may be useful in classifying plant 440 as a particular type of plant, which is why morphology engine 450 is depicted upstream of plant type engine 456 in FIG. 4. However, this is not meant to be limiting. As noted previously, the various engines 450, 456, 462 depicted in FIG. 4 may be reordered, one or more of them may be omitted, and/or they may feed any of the other engines with output data. In other implementations, plant type engine 456 may operate exclusively on vision data 411.

Plant type database 458 may store one or more machine learning models such as machine learning classifiers that are trained to process data indicative of plant 440 and generate plant type output 460 that is indicative of a classification of plant 440. In some such implementations, a different machine learning model may be trained for each distinct type of plant (e.g., genus, species). For example, one CNN may be trained, e.g., using techniques such as triplet loss, to generate binary output indicating whether plant 440 is a ragweed. Another CNN may be trained, e.g., again using techniques such as triplet loss, to generate binary output indicating whether plant 440 is a dandelion. And so on. In other implementations, a single machine learning model or an ensemble of machine learning models may be trained to generate multiple outputs, with each output representing a probability that vision data 411 depicts a different type of plant.

In some implementations, plant type output 460 may be processed by maturity engine 462, alone or in combination with vision data 411, to generate maturity output 466 that indicates a maturity level of plant 440, e.g., relative to a crop cycle of other plants and/or as an absolute age of plant 440. In other implementations, maturity engine 462 may act solely upon vision data 411 or other data indicative of vision data 411, such as a reduced-dimensionality embedding generated from vision data 411. Maturity database 464 may store one or more machine learning models that are trained to predict a maturity level of plant 440.

For example, a machine learning model such as a CNN may be trained to predict a maturity level of a particular type of plant using training examples that include a plurality of images of similar plants, labeled with their respective maturity levels. These training examples may be applied as input across the machine learning model to generate output. The output may be compared to the labels to determine an error of the model, and this error may be used to perform techniques such as back propagation and/or gradient descent to train the machine learning model. Generally speaking, various machine learning models mentioned herein may be trained using similar techniques, including back propagation, gradient descent, triplet loss, etc.

As noted previously, depending on the maturity level of plant 440, different remediation techniques may be selected by remediation technique selection engine 470. For example, if plant 440 is predicted by maturity engine 462 to be relatively young, and thus relatively fragile, then remediation technique selection engine 470 may select a less intrusive or complex remediation technique, such as snipping a few leaves of plant 440 (e.g., as shown in FIG. 3F). However, if plant 440 is predicted by maturity engine 462 to be at a relatively advanced age, and thus fairly resilient, then remediation technique selection engine 470 may select a more robust remediation technique, such as pulling the entirety of plant 440, roots and all, from soil as shown in FIG. 3D, incinerating plant 440 with one or more beams of coherent light as shown in FIGS. 3A-B, etc.

In some implementations, it may be determined, e.g., by vision data analysis engine 112, that a particular plant cannot be safely or efficiently eradicated by a robot autonomously. It could be that a weed is inexorably intertwined with a desirable plant, such that a robot lacks sufficient dexterity to remove the weed autonomously without harming the plant. Accordingly, in some such implementations, rather than a robot selecting and performing a remediation technique on the targeted plant autonomously, the robot may flag the plant for manual remediation by a person. For example, the robot may mark the plant, e.g., by shooting the plant (e.g., using launcher 132) with a paint ball or a burst of plant-safe paint, or by digitally marking the plant (e.g., using a dropped pin in a mapping application).

Figure 5:
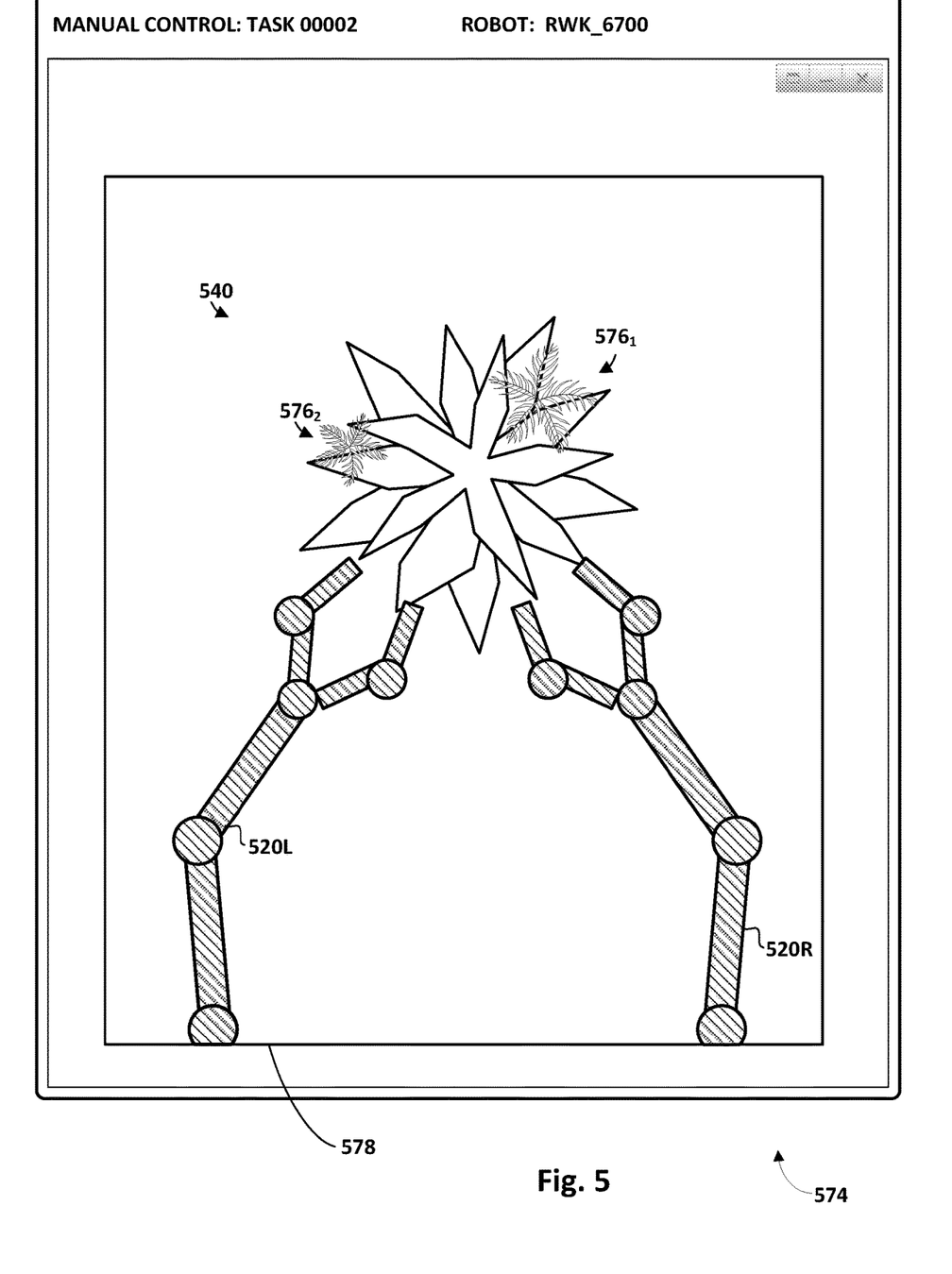
FIG. 5 depicts an example GUI that enables synchronous control of a robot.

In other such implementations, in addition to or instead of marking the plant physically and/or digitally for subsequent manual human intervention, a human operator may be provided with a manual control interface that the human operator can interact with to control a robot to remove/eradicate a plant. One such example is depicted in FIG. 5. A graphical user interface ("GUI") 574 includes a sub-window 578 that depicts vision data acquired by a robot. Two of the robot's arms, 520L and 520R, are visible in the vision data. A plant 540 has been infested with two intertwined weeds, $576_1$ and $576_2$, which would be difficult for the robot to eradicate autonomously without harming plant 540. For example, incinerating weeds $576_1$ and $576_2$ with coherent light beams would also likely damage plant 540. Accordingly, a human operator may control arms 520L and 520R manually to damage and/or extract weeds $576_1$ and $576_2$.

Figure 6:
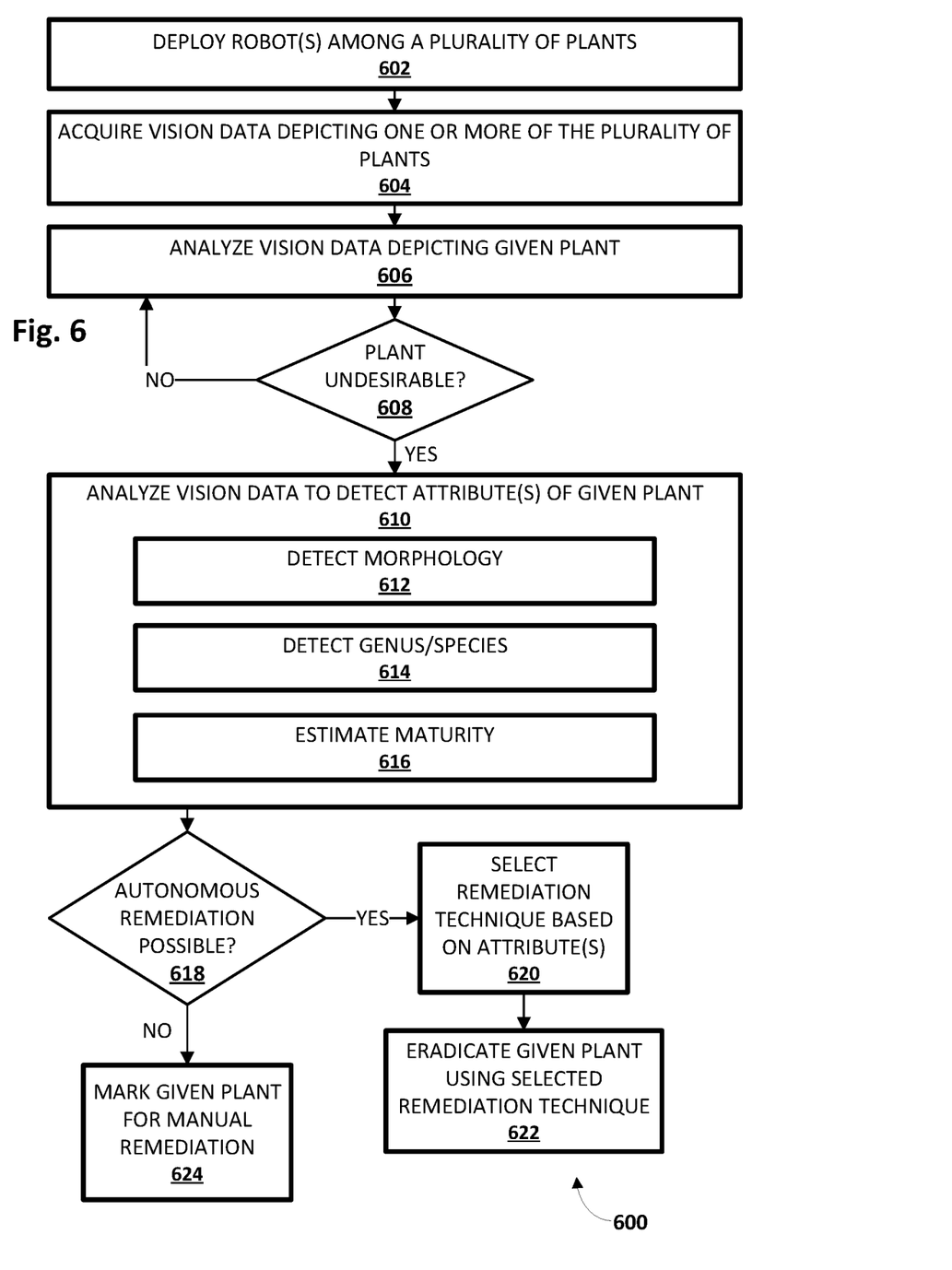
FIG. 6 a flowchart of an example method in accordance with various implementations described herein.

FIG. 6 illustrates a flowchart of an example method 600 for practicing selected aspects of the present disclosure. The operations of FIG. 6 can be performed by one or more processors, such as one or more processors of the various computing devices/systems described herein, such as by agricultural remediation system 102. For convenience, operations of method 600 will be described as being performed by a system configured with selected aspects of the present disclosure. Other implementations may include additional steps than those illustrated in FIG. 6, may perform step(s) of FIG. 6 in a different order and/or in parallel, and/or may omit one or more of the steps of FIG. 6.

At block 602, the system, e.g., by way of robot coordination engine 114, may deploy one or more robots among a plurality of plants, e.g., crops in a field. At block 604, which may occur before, during, or after performance of block 602, the system may acquire vision data depicting one or more of the plurality of plants. For example, the robot(s) deployed at block 602 may be equipped with 2D and/or 3D vision sensors that capture vision data of plants as those robots traverse through the field. Or, agricultural workers, or different, "scout" robots, may traverse through the field to acquire vision data.

At block 606, the system may analyze vision data acquired at block 604 that depicts a given plant of interest. For example, the system may sequentially step through each of a sequence of plants depicted in the vision data, and perform various techniques described herein to determine whether each plant should be targeted for eradication, and if so, which remediation technique should be employed. At block 608, for instance, the system may determine whether the given plant being analyzed is desirable (e.g., a commercial or food-producing crop) or undesirable (e.g., a weed, interloper, diseased plant, pest-infested plant, plant targeted for thinning, etc.). In some such implementations, the system, e.g., by way of vision data analysis engine 112, may apply vision data as input across one or more machine learning models to generate output that indicates, for instance, whether the plant should be eradicated or left alone. If the answer at block 608 is no, then method 600 may proceed back to block 606, and vision data depicting another plant may be analyzed.

If the answer at block 608 is yes, on the other hand, method 600 may proceed to block 610. At block 610 the system may analyze the vision data to detect attribute(s) of the given plant. For example, at block 612, morphology engine 450 may generate output 454 indicative of the given plant's morphology. At block 614, plant type engine 456 may generate output 460 indicative of the given plant's genus and/or species. At block 616, maturity engine 462 may generate output 466 indicative of the given plant's maturity.

Based on the attribute(s) detected at blocks 610-616, at block 618, the system, e.g., by way of remediation technique selection engine 470, may determine whether autonomous robotic remediation is possible. For example, a likelihood or risk that one or more remediation techniques will result in damaging nearby desirable plants may be calculated. That risk may then be compared to some risk threshold. If the answer at block 618 is yes, autonomous robotic remediation is possible, then method 700 may proceed to block 620. At block 620, the system may select a remediation technique that is most appropriate to eradicate or otherwise remove the given plant. At block 622, the system, e.g., by way of one or more robots equipped to perform the remediation technique selected at block 618, may eradicate the given plant. However, if the answer at block 618 is no, then method 700 may proceed to block 624. At block 624, the system, e.g., by way of a robot that analyzed the vision data and presumably is near the given plant, may mark the plant digitally or physical (e.g., with plant-safe paint) for manual remediation.

Figure 7:
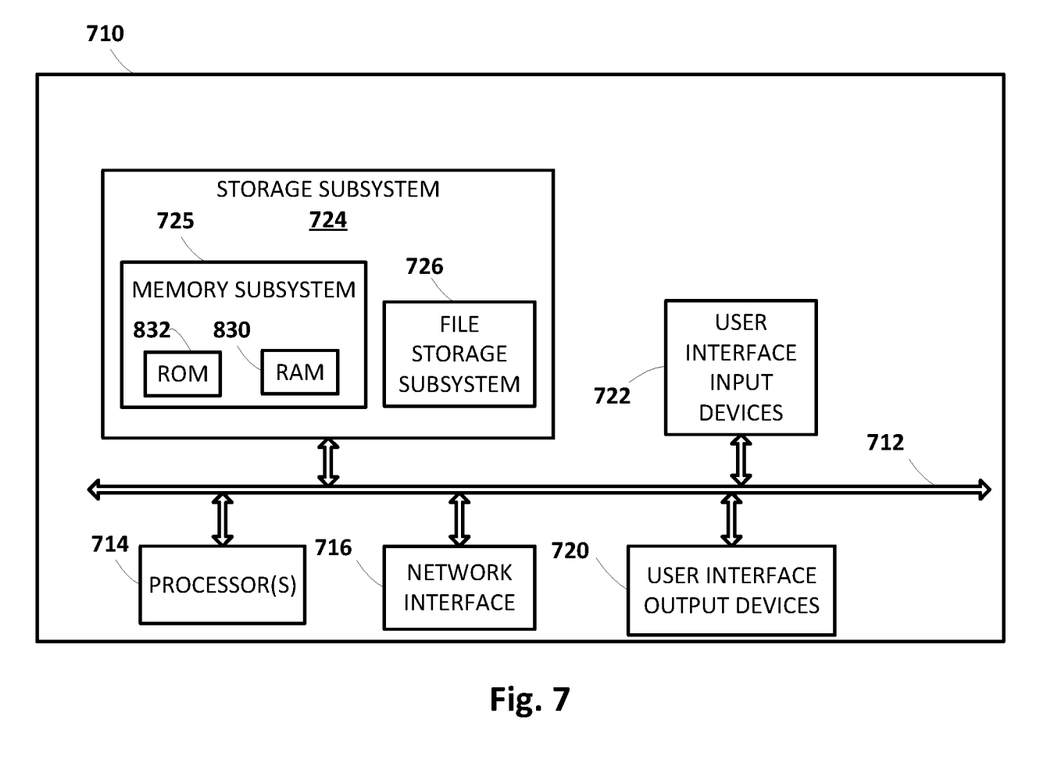
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 710 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method described herein, as well as to implement various components depicted in FIG. 1.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for robotic remediation of one or more plants, the method implemented by one or more processors and comprising:
deploying one or more robots amongst a plurality of plants;
acquiring, using one or more vision sensors of one or more of the robots, vision data that depicts one or more of the plurality of plants;
processing the vision data using a machine learning model to classify first and second plants of the plurality of plants as targets for extermination;
further analyzing the vision data to detect a first set of one or more attributes of the first plant and a second set of one or more attributes of the second plant;
selecting a first remediation technique to exterminate the first plant, wherein the first remediation technique is selected from a plurality of candidate remediation techniques based on the first remediation technique being more suitable for exterminating plants having the one or more detected attributes of the first set than the other candidate remediation techniques, and wherein at least one the plurality of candidate remediation techniques is implementable autonomously by one or more of the robots; and
selecting a second remediation technique to exterminate the second plant, wherein the second remediation technique is different than the first remediation technique and is selected from the plurality of candidate remediation techniques based on the second remediation technique being more suitable for exterminating plants having the one or more detected attributes of the second set than the other candidate remediation techniques.

2. The method of claim 1, wherein the one or more attributes include a maturity level of the given plant.

3. The method of claim 1, wherein the first set of one or more attributes includes proximity of the first plant to one or more adjacent plants.

4. The method of claim 1, wherein the one or more attributes include a genus or species of the given plant.

5. The method of claim 1, wherein at least two of the plurality of candidate remediation techniques are implementable autonomously by one or more of the robots.

6. The method of claim 5, wherein the at least two of the plurality of candidate remediation techniques are selected from the following:
incinerating the given plant with a single beam of coherent light;
incinerating the given plant with multiple beams of coherent light;
destroying the given plant with voltage transmitted through ionized air; and
mechanically destroying the plant with a solid mass launched at a high velocity.

7. The method of claim 6, wherein the solid mass is constructed with controlled-release fertilizer.

8. The method of claim 6, wherein the solid mass comprises a gelatin-filled capsule.

9. The method of claim 1, further comprising:
calculating a likelihood that applying one or more available remediation techniques to the first plant will damage one or more nearby desirable plants;
wherein selecting the first remediation technique is conditional based on the likelihood.

10. The method of claim 1, further comprising:
calculating a likelihood that applying one or more available remediation techniques to the first plant will damage one or more nearby desirable plants;
wherein the first remediation technique is selected based on the likelihood.

11. A robot comprising:
one or more processors; and
non-transitory computer-readable memory operably coupled with the one or more processors, the memory storing instructions that, in response to execution of the instructions by one or more of the processors, cause the one or more processors to:
acquire, using one or more vision sensors of the robot, vision data that depicts one or more of a plurality of plants;
process the vision data using a machine learning model to classify first and second plants of the plurality of plants as targets for extermination;
further analyze the vision data to detect a first set of one or more attributes of the first plant and a second set of one or more attributes of the second plant;
select a first remediation technique to exterminate the first plant, wherein the first remediation technique is selected from a plurality of candidate remediation techniques based on first remediation technique being more suitable for exterminating plants having the one or more detected attributes of the first set than the other candidate remediation techniques, and wherein at least one the plurality of candidate remediation techniques is implementable autonomously by the robot; and
select a second remediation technique to exterminate the second plant, wherein the second remediation technique is different than the first remediation technique and is selected from the plurality of candidate remediation techniques based on the second remediation technique being more suitable for exterminating plants having the one or more detected attributes of the second set than the other candidate remediation techniques.

12. The robot of claim 11, wherein the one or more attributes include a maturity level of the given plant.

13. The robot of claim 11, wherein the first set of one or more attributes includes proximity of the first plant to one or more adjacent plants.

14. The robot of claim 11, wherein the one or more attributes include a genus or species of the given plant.

15. The robot of claim 11, wherein at least two of the plurality of candidate remediation techniques are implementable autonomously by the robot.

16. The robot of claim 15, wherein the at least two of the plurality of candidate remediation techniques are selected from the following:
incinerating the given plant with a single beam of coherent light;
incinerating the given plant with multiple beams of coherent light;
destroying the given plant with voltage transmitted through ionized air; and
mechanically destroying the plant with a solid mass launched at a high velocity.

17. The robot of claim 16, wherein the solid mass is constructed with controlled-release fertilizer.

18. The robot of claim 16, wherein the solid mass comprises a gelatin-filled capsule.

19. The robot of claim 11, further comprising instructions to calculate a likelihood that applying one or more available remediation techniques to the first plant will damage one or more nearby desirable plants;
    wherein the first remediation technique is selected conditionally based on the likelihood.

20. At least one non-transitory computer-readable medium comprising instructions that, in response to execution of the instructions by one or more processors, cause the one or more processors to perform the following operations:
    deploying one or more robots amongst a plurality of plants;
    acquiring, using one or more vision sensors of one or more of the robots, vision data that depicts one or more of the plurality of plants;
    processing the vision data using a machine learning model to classify first and second plants of the plurality of plants as targets for extermination;
    further analyzing the vision data to detect a first set of one or more attributes of the first plant and a second set of one or more attributes of the second plant;
    selecting a first remediation technique to exterminate the first plant, wherein the first remediation technique is selected from a plurality of candidate remediation techniques based on the first remediation technique being more suitable for exterminating plants having the one or more detected attributes of the first set than the other candidate remediation techniques, and wherein at least one the plurality of candidate remediation techniques is implementable autonomously by one or more of the robots; and
    selecting a second remediation technique to exterminate the second plant, wherein the second remediation technique is different than the first remediation technique and is selected from the plurality of candidate remediation techniques based on the second remediation technique being more suitable for exterminating plants having the one or more detected attributes of the second set than the other candidate remediation techniques.

* * * * *